United States Patent
Kohlhammer et al.

[11] Patent Number: 5,922,789
[45] Date of Patent: Jul. 13, 1999

[54] REDISPERSIBLE POWDER COMPOSITIONS FOR PREPARING PHOTOGRAPHIC RECORDING MATERIALS

[75] Inventors: Klaus Kohlhammer, Marktl; Wolfgang Roth-Greiner, Weil am Rhein; Reiner Figge, Ampfing; Reinhard Haerzschel, Burghausen, all of Germany

[73] Assignee: Wacker-Chemie GmbH, Munich, Germany

[21] Appl. No.: 09/058,328

[22] Filed: Apr. 9, 1998

Related U.S. Application Data

[30] Foreign Application Priority Data

Apr. 18, 1997 [DE] Germany ............... 197 16 3505

[51] Int. Cl.$^6$ ............... C08L 57/04; D41M 5/00; G03C 1/04
[52] U.S. Cl. ............... 524/17; 524/22; 524/23; 524/24
[58] Field of Search ............... 524/17, 22, 23, 524/24

[56] References Cited

U.S. PATENT DOCUMENTS 2,856,371 10/1958 Gates .
4,244,921 1/1981 Tasior et al. .
4,409,322 10/1983 Ezaki et al. .

FOREIGN PATENT DOCUMENTS

| 443427 | 8/1967 | Australia . |
| 0307855 | 3/1989 | European Pat. Off. . |
| 0613047 | 8/1994 | European Pat. Off. . |
| 3023112 | 1/1981 | Germany . |
| 3150264 | 7/1982 | Germany . |
| 3417388 | 11/1985 | Germany . |
| 1541223 | 2/1990 | U.S.S.R. . |

OTHER PUBLICATIONS

Fox T. G., Bull.Am. Physics Soc. 1, 3, p. 123 (1956).

Primary Examiner—Nathan M. Nutter
Attorney, Agent, or Firm—Burgess, Ryan & Wayne

[57] ABSTRACT

The invention is a ready-to-use, water-redispersible powder composition useful for preparing photographic recording materials or inkjet recording materials, which comprises a mixture containing polymers made from ethylenically unsaturated monomers and gelatin, wherein the polymers are prepared by emulsion polymerization in the presence of at least one emulsifier selected from emulsifiers with ionic and nonionic groups and if exclusively ionic emulsifiers are used, the copolymerization is carried out in the presence of comonomers which contain one or more groups selected from —COOH, —OH, $SO_3^-$, $NCH_2OH$ and —C=O.

20 Claims, No Drawings

REDISPERSIBLE POWDER COMPOSITIONS FOR PREPARING PHOTOGRAPHIC RECORDING MATERIALS

BACKGROUND OF THE INVENTION

The invention relates to water-redispersible, ready-to-use powder compositions useful for preparing photographic recording materials, such as photographic papers, photographic films and inkjet recording materials.

BACKGROUND ART

Photographic recording materials are generally constructed from one or more layers of photographic emulsion, and these comprise gelatin and polymer particles as binders, as well as the light-sensitive silver halide salts and other photoactive agents, such as sensitizers, dyes, etc. Coatings made from a mixture of gelatin and polymer particles are also frequently applied as covering layer to protect the layer of photographic emulsion or as coating on the reverse side of the support material.

The preparation of such photographic recording materials is described, for example, in EP-A 613047, DE-A 3150264 (U.S. Pat. No. 4,409,322) and DE-A 3023112 U.S. Pat. No. 4,294,921). Starting materials here are mixtures of aqueous gelatin solution and polymer emulsion, to which light-sensitive silver halides and other additives may also be added if desired. To prepare the silver halide coating, an aqueous gelatin solution is generally mixed with an aqueous solution of a silver salt, such as silver nitrate, and an aqueous solution of a halide, such as potassium halide. The polymer emulsion is added only as the last constituent of the formulation after the silver salt has been precipitated, in order to prevent flocculation of the polymer particles. The individual layers of the photographic recording material are then applied in sequence to the support material in a manner known to the person skilled in the art, for example by curtain coating, cascade coating or slot-die coating.

One problem is that the aqueous gelatin solutions and aqueous polymer dispersions hitherto used for coating have unsatisfactory shelf-lives and are readily damaged, especially by bacterial contamination. Another problem has been the inadequate electrolyte stability of the aqueous polymer dispersions.

DE-A 3417388 (Derwent Abstract AN 85-069875) discloses dispersion powders which are obtainable by polymerization in the presence of water-soluble naturally occurring materials, such as gelatin, and subsequent drying with addition of antiblocking agents. The dispersion powders are recommended for use in adhesives for the textile, paper and building industries. These powders are unsuitable for use in photographic recording materials, since in the polymerization it is only possible to use low-molecular-weight, non-gelling gelatins as protective colloid.

Derwent Abstracts AN 90-259209 of SU-A 1541223 describes polymer powders which are intended for preventing the evaporation of highly volatile liquids and which are obtainable by spray-drying a dispersion of polymer and hollow beads made from glass, silica gel or gelatin.

EP-A 307855 discloses aqueous dispersions of polymer particles which are covered covalently with a layer of gelatin and are used as matting agent in photographic coatings.

U.S. Pat. No. 2,856,371 describes powder compositions made from polymer powder and gelatin. These powders are unsuitable for use in photographic applications, however, because of inadequate electrolyte stability.

The object was therefore to provide these starting materials in a form which does not have the shelf-life disadvantages mentioned. The starting-materials preparation should also have sufficient stability to addition of inorganic electrolyte solutions (photographic salts).

BRIEF SUMMARY OF THE INVENTION

The invention provides ready-to-use, water-redispersible powder compositions useful for preparing photographic recording materials or inkjet recording materials, which comprise a mixture of polymers made from ethylenically unsaturated monomers and gelatin, wherein the polymers are prepared by emulsion polymerization, where either a) at least one emulsifier with ionic and nonionic groups is used for stabilization, or b) if exclusively ionic emulsifiers are used for stabilization, the copolymerization is carried out in the presence of comonomers which contain one or more substituents selected from the group consisting of —COOH, —OH, $SO_3^-$, —$NCH_2OH$ and —C=O.

Suitable ethylenically unsaturated monomers are one or more monomers selected from the group consisting of the vinyl esters of alkylcarboxylic acids having from 1 to 12 carbon atoms, acrylates or methacrylates of alcohols having from 1 to 12 carbon atoms, ethylene, styrene and vinyl chloride. In a preferred embodiment, in particular for preparation in the presence of exclusively ionic emulsifiers, the polymers furthermore also contain comonomers with functional groups, such as-comonomers, —COOH, —OH, $SO_3^-$, —$NCH_2OH$ and —C=O. The functional comonomers are generally present in an amount of from 0.1 to 10% by weight, based on the total weight of the polymer.

The selection of monomers and/or the selection of the proportions by weight of the comonomers here is made in such a manner that the polymers have a glass transition temperature Tg of from −60 to +120° C., preferably from −35 to +100° C. The glass transition temperature Tg of the polymers may be determined in a known manner by differential scanning calorimetry (DSC). The Tg may also be approximated in advance by the Fox equation. According to Fox, T. G., Bull. Am. Physics Soc. 1, 3, page 123 (1956): $1/Tg = x_1/Tg_1 + x_2/Tg_2 + \ldots + x_n/Tg_n$, where $x_n$ is the proportion by weight (% by weight/100) of the monomer n and $Tg_n$ is the glass transition temperature in degrees Kelvin of the homopolymer of the monomer n. Tg values for homopolymers are listed in Polymer Handbook 2nd Edition, J. Wiley & Sons, New York (1975).

Preference is given to vinyl acetate, vinyl esters of alpha-branched monocarboxylic acids having 9 or 10 carbon atoms (VeoVa9®, VeoVa10®), acrylates, methacrylates, ethylene, styrene and vinyl chloride. Preferred functional comonomers are acrylic acid, methacrylic acid, hydroxyethyl acrylate, acrylamido-2-methylpropanesulfonic acid, styrenesulfonic acid, sulfopropyl acrylate, N-methylolacrylamide and diacetoneacrylamide.

Particular preference is given to polymers of one or more monomers which are selected from the group consisting of styrene, butyl acrylate and methyl methacrylate and which contain, as functional comonomers, one or more comonomers selected from the group consisting of methacrylic acid, hydroxyethyl acrylate, acrylamido-2-methylpropanesulfonic acid and diacetoneacrylamide.

The polymers are prepared by emulsion polymerization in an aqueous phase at temperatures of from 60 to 90° C. The polymerization is initiated in a known manner by means of the usual inorganic or organic peroxides, which are at least to some extent water-soluble. If desired, reducing agents may be added for catalytic decomposition of peroxides.

The polymerization is carried out in the presence of from 0.5 to 30% by weight, preferably from 0.5 to 10% by weight, of emulsifier, based in each case on the monomer amount. Surprisingly, it has been found that the electrolyte stability of a powder composition made from polymer powder and gelatin is significantly influenced by the selection of the emulsifier used for preparing the polymer.

Polymerization is preferably carried out in the presence of emulsifiers with ionic and nonionic groups, nonionic groups being understood to be hydrophilic groups, preferably polyethylene oxide units with from 3 to 40 mol of ethylene oxide; the ionic groups may be of either anionic or cationic type. Indeed, it has been found that this ensures the electrolyte stability of the redispersion, whatever the polymer composition.

Examples of emulsifiers with anionic and nonionic groups are ethoxylated alkylphenol sulfates, ethoxylated fatty alcohol sulfonates, ethoxylated alkylphenol phosphates, ethoxylated fatty alcohol sulfates and ethoxylated fatty alcohol phosphates. An example of an emulsifier with cationic and nonionic groups is N-tallowalkyl-N,N'-dimethyl-N,N'-polyethylene glycol propylene bisammonium bismethosulfate.

If only ionic emulsifiers are used to stabilize the polymerization mixture, the emulsion polymerization must take place in the presence of the functional comonomers mentioned. Examples of ionic emulsifiers are the alkali metal and ammonium salts of alkyl sulfates, the alkali metal and ammonium salts of alkylsulfonic acids and of alkylarylsulfonic acids, and also alkylated disulfonated diphenyl oxide emulsifiers.

Protective colloids may, if desired, be used as dispersants in small amounts of up to 5% by weight, based on the monomer amount. Polymerization is preferably carried out without adding protective colloid.

The emulsion polymerization is preferably carried out by the feed process, at least a part of the monomers being metered in during the polymerization. Particular preference is given to a method of conducting the reaction in which a part of the emulsifiers and also a part of the monomers in aqueous solution or emulsion are the initial charge and the remainder of the monomers and emulsifiers is metered into the reaction mixture after the start of the reaction in the form of a pre-emulsion.

After the reaction has ended, the dispersion is cooled and the pH adjusted, preferably to from 6.5 to 7.0. This gives dispersions with a solids content of from 30 to 40%. The average particle size of the dispersed polymer particles is <500 nm, preferably <200 nm, most preferably <100 nm.

The gelatin used may be water-soluble proteins obtainable by hydrolyzing animal collagen. For the photographic application, it is important that the gelatin is gellable. The average molecular weight Mw should therefore be more than 10,000 g/mol, preferably more than 100,000 g/mol. Preference is given to gelatins obtained by basic hydrolysis of ossein. For photographic applications, particular preference is given to high-molecular-weight (Mw>100,000 g/mol) gellable gelatins which are obtained by basic hydrolysis of bovine ossein and which may, if desired, also be deionized.

For preparing the redispersible powder compositions, the gelatin is dissolved in hot water and an aqueous solution is prepared with a gelatin content of preferably up to 25% by weight, particularly preferably from 4 to 15% by weight, based in each case on the total weight. The aqueous polymer dispersion is metered into the gelatin solution, care being taken that the temperature of the mixture during the feed does not fall below the gel point, which is usually from 30 to 40° C. If desired, the pH of the mixture can be adjusted to the isoelectric point of the gelatin. It is also possible to add protective colloids compatible with gelatin, for example polyvinyl alcohols or dextrans.

The mixture may be dried in various ways:

The aqueous mixture may be spray-dried. The temperature of the drying air here may be either above or below the glass transition temperature of the polymer present in the mixture. The drying may also take place by cooling the aqueous mixture to below the gel point of the gelatin, compressing the mixture through nozzles after gelation or comminuting it by the pasta press method and drying it using a belt drier. Another possibility is to cast the aqueous mixture to give a film, to dry this and to grind it after drying to give a powder. Finally, it is also possible to dry the aqueous mixture by freeze-drying.

The mixing ratio (weight ratio) of polymer to gelatin is from 0.1:99.9 to 70:30, preferably from 5:95 to 50:50.

In preparing the photographic recording materials or inkjet recording materials, the novel powder composition is redispersed in water. Other formulation constituents usual in this application, such as silver halides, gelatin hardeners, surfactant additives, matting agents, stabilizers and sensitizers may be added if desired. The dispersion may be applied to the support material by known processes, using curtain coating, cascade coating, dip coating, air knife, spraying or extrusion coating. Suitable support materials are known to the person skilled in the art. Examples of these are paper, polyester films, such as polyethylene terephthalate films, or polypropylene.

Preference is given to the use of the powder compositions as binders in light-sensitive, silver-halide-containing layers on opaque (paper) or transparent (polymer films) bases. Preference is also given to the use of the powder composition as binder in color-receptive layers of inkjet papers and inkjet films.

EXAMPLES

Preparation of the polymer dispersions used in Examples 1 to 4:

Example 1

2.43 g of emulsifier A, 13.9 g of emulsifier B, 4.9 g of acrylamido-2-methylpropanesulfonic acid (Na salt), 1.0 g of methacrylic acid, 200 g of styrene, 19.5 g of hydroxyethyl acrylate, 200 g of methyl methacrylate and 68.2 g of butyl acrylate were emulsified in water, one after the other, in a metering vessel. In a second metering vessel, 1.48 g of potassium persulfate was dissolved in 49.7 ml of water and made ready for use. The polymerization was carried out in a 2 l laboratory autoclave. For this, 6.1 g of emulsifier A were dissolved in 104 ml of water and heated to 75° C. with stirring. After temperature equilibrium was reached, the two previously prepared feed solutions were brought in at the same time and metered in over a period of 4 h. After the feed had ended, the reaction temperature was increased to 85° C. to complete the polymerization. The pH was adjusted to about 6.8 by adding aqueous NaOH. This gave a polymer dispersion with the following characteristics: solids content 35.2%, viscosity: 18.7 mPas, particle size: 60 nm, glass transition temperature: 78° C.

The emulsifiers and monomers in Examples 2 to 4 were varied according to the table below:

TABLE

| Example | 1 | 2 | 3 | 4 |
|---|---|---|---|---|
| Emulsifier A | 8.53 g | 30.3 g | — | — |
| Emulsifier B | 13.9 g | — | — | 13.9 g |
| Emulsifier C | — | — | 70.6 g | 81.8 g |
| Butyl acrylate | 68.2 g | 286.0 g | 286.0 g | 302.0 g |
| Styrene | 200.0 g | — | 204.0 g | 200.0 g |
| MMA | 200.0 g | 204.0 g | — | 200.0 g |
| HEA | 19.5 g | 20.4 g | 20.4 g | 19.5 g |
| MAS | 1.0 g | 5.1 g | 5.1 g | 1.0 g |
| AMPS-Na | 4.87 g | 2.4 g | — | 4.87 g |
| Solids content | 35.2% | 30.1 | 30.3% | 35.1% |
| Glass transition temperature | 78° C. | 10° C. | 2° C. | 6° C. |
| Particle size | 60 nm | 60 nm | 63 nm | 59 nm |

Emulsifier A = alkyl sulfate with about 12 carbon atoms (Na salt);
Emulsifier B = alkylphenol-(ethylene oxide) sulfate (Na salt);
Emulsifier C = alkylphenol-(ethylene oxide) phosphate (Na salt);
AMPS-Na = acrylamido-2-methylpropanesulfonic acid (Na salt);
HEA = hydroxyethyl acrylate;
MAS = methacrylic acid;
MMA = methyl methacrylate To demonstrate complete redispersibility, the particle size was measured in each case after mixing the dispersion with the gelatin solution, i.e. before the drying process, and after the redispersion of the dried polymer formulation. The compatibility of the redispersion with salts was determined by titrating 100 ml of the redispersion (solids content: 10%) with a 10% strength $CaCl_2$ solution until coagulation became macroscopically visible.

Example 1

The dispersion was mixed with a 10% strength aqueous gelatin solution in a ratio of 50:50 (polymer : gelatin, based in each case on dry weight). The particle size of this mixture was 126 nm and showed that a gelatin layer had formed around the polymer particle. The solution was spray-dried at 80° C. air temperature to give a free-flowing, non-blocking powder. After the redispersion of this powder in water heated to 50° C., the particle size was 136 nm; the composition was therefore completely redispersed. The compatibility with salts was 7.3 ml of $CaCl_2$ solution (10%). The redispersion was therefore electrolyte-stable.

Example 2

The dispersion was mixed with a 10% strength aqueous gelatin solution in a ratio of 30:70 (polymer : gelatin, based in each case on dry weight). The particle size of this mixture was 98 nm and showed that a gelatin layer had formed around the polymer particle. The solution was spray-dried at 80° C. air temperature to give a free-flowing, non-blocking powder. After the redispersion of this powder in water heated to 50° C., the particle size was 112 nm; the composition was therefore completely redispersed. Compatibility with salts: 12.9 ml of $CaCl_2$ solution (10%). The redispersion was therefore electrolyte-stable.

Example 3

The dispersion was mixed with a 10% strength aqueous gelatin solution in a ratio of 30:70 (polymer : gelatin, based in each case on dry weight). The particle size of this mixture was 126 nm and showed that a gelatin layer had formed around the polymer particle. The solution was spray-dried at 80° C. air temperature to give a free-flowing, non-blocking powder. After the redispersion of this powder in water heated to 50° C., the particle size was 136 nm; the composition was therefore completely redispersed. Compatibility with salts: 2.3 ml of $CaCl_2$ solution (10%). The redispersion was therefore sufficiently electrolyte-stable.

Example 4

The dispersion was mixed with a 10% strength aqueous gelatin solution in a ratio of 50:50 (polymer : gelatin, based in each case on dry weight). The particle size of this mixture was 105 nm and showed that a gelatin layer had formed around the polymer particle. The solution was spray-dried at 80° C. air temperature to give a free-flowing, non-blocking powder. After the redispersion of this powder in water heated to 50° C., the particle size was 116 nm; the composition was therefore completely redispersed. Compatibility with salts: 15.9 ml of $CaCl_2$ solution (10%). The redispersion was therefore electrolyte-stable.

The following examples illustrate the invention with commercially available polymer dispersions. To demonstrate complete redispersibility, the particle size was measured in each case after mixing the dispersion with the gelatin solution, i.e. before the drying process, and after the redispersion of the dried polymer formulation. The compatibility of the redispersion with salts was determined by titrating 100 ml of the redispersion (solids content: 10%) with a 10% strength $CaCl_2$ solution until coagulation became macroscopically visible.

Example 5

A styrene-butyl acrylate dispersion (Vinnapas® LL990 from Wacker Chemie GmbH) stabilized with an emulsifier with anionic and nonionic groups and having a glass transition temperature of 80° C. and a particle size of about 60 nm (determined using Coulter N4) was mixed with a 10% strength aqueous gelatin solution in a ratio of 50:50 (polymer : gelatin, based in each case on dry weight). The particle size of this mixture was 110 nm and showed that a gelatin layer had formed around the polymer particle. The solution was spray-dried at 80° C. air temperature to give a free-flowing, nonblocking powder. After redispersion of this powder in water heated to 50° C., the particle size was 115 nm and the complete redispersibility of this polymer. The compatibility with salts was 5.5 ml of $CaCl_2$ solution (10%). The redispersion was therefore electrolyte-stable.

Example 6

An acrylate dispersion (Vinnapas® LL970 from Wacker Chemie GmbH) stabilized with an emulsifier with anionic and nonionic groups and having a glass transition temperature of +10° C. and a particle size of about 65 nm (determined using Coulter N4) was mixed with a 10% strength aqueous gelatin solution in a ratio of 30:70 (polymer : gelatin, based in each case on dry weight). The particle size of this mixture was 98 nm and showed that a gelatin layer had formed around the polymer particle. A film was cast from the solution on a polyethylene substrate, cooled to room temperature and then dried. After complete drying overnight at room temperature, the film was detached from its substrate and redispersed at 50° C. in water. The particle size measured was 106 nm; the polymer preparation was therefore completely redispersed. The compatibility with salts was 14.0 ml of $CaCl_2$ solution (10%). The redispersion was therefore electrolyte-stable.

Example 7

A styrene-butyl acrylate dispersion (Vinnapas® LL9400 from Wacker Chemie GmbH) stabilized with an emulsifier with anionic and nonionic groups and having a glass transition temperature of +8° C. and a particle size of about 59 nm (determined using Coulter N4) was mixed with a 10% strength aqueous gelatin solution in a ratio of 30:70 (polymer : gelatin, based in each case on dry weight). The particle size of this mixture was 103 nm and showed that a gelatin layer had formed around the polymer particle. A film was cast from the solution on a polyethylene substrate, cooled to room temperature and then dried. After complete drying overnight at room temperature, the film was detached from its substrate and redispersed at 50° C. in water. The particle size measured was 118 nm; the composition was therefore completely redispersed. The compatibility with salts was 16.8 ml of $CaCl_2$ solution (10%). The redispersion was therefore electrolyte-stable.

Comparative Example 8

A polymer dispersion with a solids content of 20% by weight was prepared by emulsion polymerization of 49 parts of n-butyl acrylate, 21 parts of styrene and 30 parts of gelatin, and also Na lauryl sulfate as anionic emulsifier. This dispersion was mixed with a warm aqueous gelatin solution, dried in air and redispersed in warm water. On dropwise addition of an aqueous $CaCl_2$ solution (10%), coagulation was observed as early as after the second drop. The redispersion was therefore not electrolyte-stable.

We claim:

1. A ready-to-use, water-re-dispersible powder composition useful for preparing photographic recording materials or inkjet recording materials comprising a mixture of at least one polymer made from ethylenically unsaturated monomers physically compounded with gelatin, wherein the polymers are prepared by emulsion polymerization, in the presence of at least one emulsifier selected from the group consisting of emulsifiers with ionic and nonionic groups and provided that when exclusively ionic emulsifiers are used, the copolymerization is carried out in the presence of ethylenically unsaturated comonomers which contain at least one group selected from the group consisting of —COOH, —OH, $SO_3$, —$NCH_2OH$ and —C═O.

2. The redispersible powder composition useful for preparing photographic recording materials or inkjet recording materials as claimed in claim 1, wherein the composition contains polymers of at least one monomer selected from the group consisting of vinyl esters of alkylcarboxylic acids having from 1 to 12 carbon atoms, acrylates of alcohols having from 1 to 12 carbon atoms, methacrylates of alcohols having from 1 to 12 carbon atoms, ethylene, styrene and vinyl chloride.

3. The redispersible powder composition useful for preparing photographic recording materials or inkjet recording materials as claimed in claim 1, wherein the composition contains polymers of at least one monomer selected from the group consisting of styrene, butyl acrylate and methyl methacrylate and at least one functional comonomer selected from the qroup consisting of methacrylic acid, hydroxyethyl acrylate, acrylamido-2-methylpropane-sulfonic acid and diacetoneacrylamide.

4. The redispersible powder composition for preparing photographic recording materials or inkjet recording materials as claimed in claim 1, wherein the polymers are prepared in the presence of from 0.5 to 30% by weight based on the weight of the monomers of at least one emulsifier with ionic and nonionic groups.

5. The redispersible powder composition useful for preparing photographic recording materials or inkjet recording materials as claimed in claim 1, wherein the polymers are prepared in the presence of from 0.5 to 30% by weight of the polymer of exclusively anionic or cationic emulsifiers and in the presence of ethylenically unsaturated comonomers which contain at least one substituent selected from the group consisting of —COOH, —OH, $SO_3^-$, —$NCH_2OH$ and —C═O.

6. The redispersible powder composition useful for preparing photographic recording materials or inkjet recording materials as claimed in claim 1, wherein the composition contains gellable gelatins which are obtained by basic hydrolysis of bovine ossein and have an average molecular weight MW>10,000 g/mol.

7. The redispersible powder composition useful for preparing photographic recording materials or inkjet recording materials as claimed in claim 1, wherein the mixing ratio by weight of polymer to gelatin in the water-redispersible powder composition is from 5:95 to 50:50.

8. The redispersible powder composition useful for preparing photographic recording materials or inkjet recording materials as claimed in claim 2, wherein the polymers are prepared in the presence of from 0.5 to 30% by weight based on the weight of the monomers of at least one emulsifier with ionic and nonionic groups.

9. The redispersible powder composition useful for preparing photographic recording materials or inkjet recording materials as claimed in claim 3, wherein the polymers are prepared in the presence of from 0.5 to 30% by weight based on the weight of the monomers of at least one emulsifier with ionic and nonionic groups.

10. The redispersible powder composition useful for preparing photographic recording materials or inkjet recording materials as claimed in claim 2, wherein the polymers are prepared in the presence of from 0.5 to 30% by weight of the polymer of exclusively anionic or cationic emulsifiers and in the presence of ethylenically unsaturated comonomers which contain at least one substituent selected from the group consisting of —COOH, —OH, $SO_3^-$, —$NCH_2OH$ and —C═O.

11. The redispersible powder composition useful for preparing photographic recording materials or inkjet recording materials as claimed in claim 3, wherein the polymers are prepared in the presence of from 0.5 to 30% by weight of the polymer of exclusively anionic or cationic emulsifiers and in the presence of ethylenically unsaturated comonomers which contain at least one substituent selected from the group consisting of —COOH, —OH, $SO_3^-$, —$NCH_2OH$ and —C═O.

12. The redispersible powder composition useful for preparing photographic recording materials or inkjet recording materials as claimed in claim 2, wherein the composition contains gellable gelatins which are obtained by basic hydrolysis of bovine ossein and have an average molecular weight MW >10,000 g/mol.

13. The redispersible powder composition useful for preparing photographic recording materials or inkjet recording materials as claimed in claim 3, wherein the composition contains gellable gelatins which are obtained by basic hydrolysis of bovine ossein and have an average molecular weight MW >10,000 g/mol.

14. The redispersible powder composition useful for preparing photographic recording materials or inkjet recording materials as claimed in claim 4, wherein the composition contains gellable gelatins which are obtained by basic hydrolysis of bovine ossein and have an average molecular weight MW >10,000 g/mol.

15. The redispersible powder composition useful for preparing photographic recording materials or inkjet recording materials as claimed in claim 5, wherein the composition contains gellable gelatins which are obtained by basic hydrolysis of bovine ossein and have an average molecular weight MW >10,000 g/mol.

16. The redispersible powder composition useful for preparing photographic recording materials or inkjet recording materials as claimed in claim 2, wherein the mixing ratio by weight of polymer to gelatin in the water-redispersible powder composition is from 5:95 to 50:50.

17. The redispersible powder composition useful for preparing photographic recording materials or inkjet recording materials as claimed in claim 3, wherein the mixing ratio by weight of polymer to gelatin in the water-redispersible powder composition is from 5:95 to 50:50.

18. The redispersible powder composition useful for preparing photographic recording materials or inkjet recording materials as claimed in claim 4, wherein the mixing ratio by weight of polymer to gelatin in the water-redispersible powder composition is from 5:95 to 50:50.

19. The redispersible powder composition useful for preparing photographic recording materials or inkjet recording materials as claimed in claim 5, wherein the mixing ratio by weight of polymer to gelatin in the water-redispersible powder composition is from 5:95 to 50:50.

20. The redispersible powder composition useful for preparing photographic recording materials or inkjet recording materials as claimed in claim 6, wherein the mixing ratio by weight of polymer to gelatin in the water-redispersible powder composition is from 5:95 to 50:50.

* * * * *